United States Patent [19]
Minott

[11] 4,407,563
[45] Oct. 4, 1983

[54] HIGH SPEED MULTI FOCAL PLANE OPTICAL SYSTEM

[75] Inventor: Peter O. Minott, Bowie, Md.

[73] Assignee: The United States of America as represented by the United States National Aeronautics and Space Administration, Washington, D.C.

[21] Appl. No.: 333,535

[22] Filed: Dec. 22, 1981

[51] Int. Cl.³ .................. G02B 27/10; G02B 17/08
[52] U.S. Cl. ................................. 350/173; 350/445
[58] Field of Search ............. 350/173, 171, 169, 172, 350/174, 170, 445, 286, 287

[56] References Cited
U.S. PATENT DOCUMENTS 2,963,937 12/1960 Raitieve .......................... 350/173

FOREIGN PATENT DOCUMENTS 54-73065 6/1979 Japan ............................ 350/173

Primary Examiner—Jon W. Henry
Attorney, Agent, or Firm—John O. Tresansky; John R. Manning; Robert E. Bushnell

[57] ABSTRACT

Apparatus for eliminating beamsplitter generated optical aberrations in a pupil concentric optical system providing a plurality of spatially separated images on different focal planes or surfaces (30, 56). The system employs a buried surface beamsplitter (40, 40') having spherically curved entrance (42) and exit faces (44, 54, 74, 76) which are concentric to a system aperture stop (10) with the entrance face being located in the path of a converging light beam (34) directed thereto from an image forming objective element (12) which is also concentric to the aperture stop.

17 Claims, 4 Drawing Figures

HIGH SPEED MULTI FOCAL PLANE OPTICAL SYSTEM

ORIGIN OF THE INVENTION

The invention described herein was made by an employee of the United States Government and may be manufactured and used by or for the Government for governmental purposes without the payment of any royalties thereon or therefor.

TECHNICAL FIELD

The invention relates generally to optical imaging systems and more particularly to pupil concentric optical systems.

BACKGROUND ART

There are many optical applications where it is desirable to have one optical objective form several images on different focal planes so that several separate detectors may view the same scene element. Examples of such applications are color TV cameras which use three vidicon tubes to record the scene in three colors and photographic cameras used in converting a color scene into three color images for color printing presses. Another application of particular importance is with respect to multi-spectral linear array mapping cameras which include several linear arrays of detectors located in the focal plane of a lens situated, for example, in an orbiting satellite. If the several linear arrays are parallel and if the direction of motion of the satellite is perpendicular to the arrays, a swath type of image will be generated as each array is swept across the earth in what is known as a pushbroom scan mode. Since the several linear arrays are not coincident, each array will see a point on the earth at a different delayed time. This time delay causes problems if the satellite rolls, pitches or yaws in an unpredictable manner between the passage of the several arrays. Accordingly, it becomes impossible to superimpose data of the arrays in a simple time delay process for generating an image. Also, if there is field dependent distortion in the objective, it is difficult to reconstruct the image without complicated computer models of the distortion. Further, if the scene on earth is viewed obliquely, it is extremely difficult to reconstruct the scene due to the fact that each detector array sees the scene at a slightly different angle.

For these reasons, it is normally desirable to place a selected number of beam splitters behind an objective lens and divide the output of the lens into several beams of light, each of which impinges on its own focal plane. This process shares the energy from the lens among the several focal planes, but uses only one common objective lens and permits all the linear arrays to be conjugate to a common line to the scene of view.

A serious limitation of this apparently simple solution exists when a plate or block type beamsplitter is placed in a converging ray light beam due to the fact that extremely undesirable optical aberrations are produced by the beamsplitter. These aberrations are of the well known chromatic and Seidel type. These aberrations can be compensated for when a block type beamsplitter is used if compensating aberrations are built into the lens, such as by designing opposite sign aberrations into the image forming section of the systems so that the sum of the compensating aberrations and the beamsplitting aberrations equals zero. However, the compensation process requires several additional optical elements and if the objective is large compared to the detector array, the complexity and cost of the components may be extremely high. Further, if the system is of a large aperture type, i.e. on the order of several feet in diameter, refractive elements can become prohibitively heavy requiring use, for example, of a reflective objective. Furthermore, with a reflective objective, a problem of eliminating aberrations becomes even more difficult because the designer has relatively little freedom to compensate for the chromatic aberrations in the beamsplitters.

One known method of eliminating beamsplitter aberrations is through use of pellicle type beamsplitters incorporating microscopically thin membranes stretched over a frame and coated with an evaporated beamsplitter layer. While pellicles effectively eliminate the optical problems, they are extremely fragile and are very prone to vibrations in a noisy environment. Another known method includes the use of a two element relay lens designed so that the rays are collimated between the elements. Beamsplitters are located between the two relay lens elements in the collimated region. Since the rays are not converging, no aberrations occur. The disadvantage of this method is that for each split, two reimaging lenses and one collimating lens must be used. Further, the problem of designing the relay lens becomes more difficult than that of designing the original objective if wide fields of view are required.

STATEMENT OF THE INVENTION

Accordingly, it is an object of the present invention to provide an improved optical system which is relatively free of distortion.

Another object of the invention is to provide a high resolution optical system adapted to provide multiple focal planes.

Still another object of the invention is to provide an inherently wide field optical system of a relatively simple construction with beamsplitters which do not add new types of aberrations to the system.

These and other objects are provided by a pupil concentric system including an aperture stop, at least one image forming element and a buried surface beamsplitter situated in the path of the converging light beam. The beamsplitter has an entrance face and at least two exit faces from which images emerge with the entrance and exit faces of the beamsplitter being curved and optically concentric to the aperture stop whereby beamsplitter generated aberrations are eliminated.

The foregoing as well as other objects, features and advantages of the invention will become apparent from the following detailed description when taken in conjunction with the appended drawings.

DETAILED DESCRIPTION OF THE INVENTION

Figure 1A:
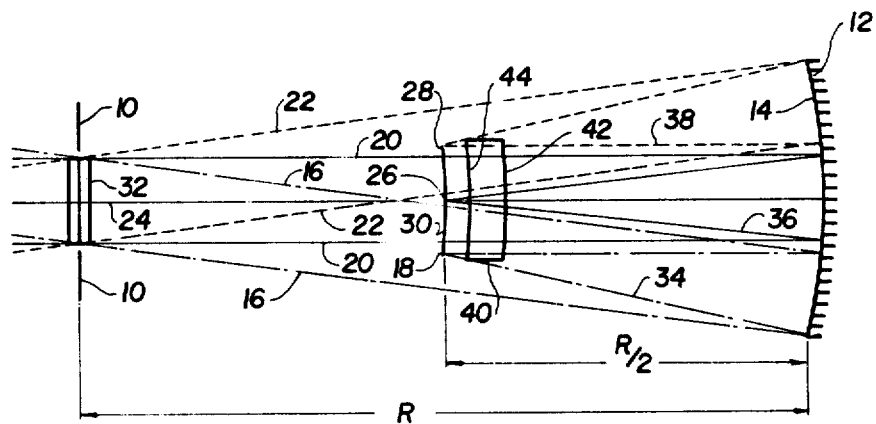
FIGS. 1A and 1B are top plan and side elevational views, respectively, of a simple pupil concentric optical system embodying the subject invention.
Figure 1B:
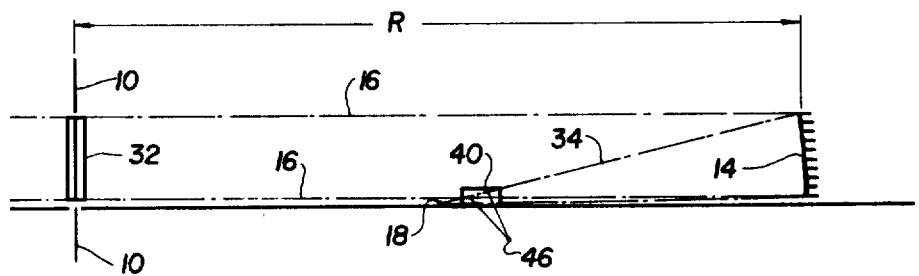

Referring now to the drawings wherein like numerals refer to like parts, FIGS. 1A and 1B illustrate a single reflector system typically representative of the well known Schmidt type of pupil concentric system. The system includes an aperture stop or pupil 10 which is located a radius distance R from a spherical reflector element 12. The reflector element 12 is concentric with the aperture stop 10 and has a spherically curved concave reflecting surface 14 which is adapted to converge an incident light beam 16 (FIG. 1B) to focal point 18. Furthermore, as shown in FIG. 1A, any additional incident beams represented by, for example the rays 20 and 22 which are directed respectively along the axis 24 and to the left thereof, they will converge at the focal points 26 and 28 which lie along a focal surface 30 which includes the focal point 18. The focal surface 30, moreover, is located a distance approximately R/2 from the single concentric reflector 12. In order to compensate for coma, astigmatism and spherical aberration, one or more corrector plates 32 of known construction are located at the aperture stop 10. The apparatus thus far is of a conventional nature; however, if one were to utilize a cube type beamsplitter in the path of the converging beams 34, 36 and 38 as shown in FIG. 1A, severe Seidel and chromatic aberrations would be generated and it is to this problem that the present invention is directed.

A beamsplitter 40 of a specific construction is positioned in the path of the converging beam or beams reflected from the spherically curved face 14 of the reflector 12. This beamsplitter 40 has entrance and exit faces which are spherically curved and concentric, optically at least, to the aperture stop 10. As shown in FIG. 1A, beamsplitter 40 is an optical element which forms an image on focal surface 30. It has a convex entrance face 42 and a concave exit face 44. The entrance face 42, moreover, has a curvature which matches the spherical curvature of the reflector 12 so as to maintain light beams perpendicular to the entrance face for all parts of the field of view. The beamsplitter 40, moreover, is a buried surface beamsplitter having an interior partially reflective surface, not shown, for producing a folded-back image at a focal point 46 shown in FIG. 1B. As will be shown, the exit face for producing the image at the focal point 46 is made to be optically concentric with the aperture stop 10. Such a configuration will result in eliminating any aberrations which would otherwise be generated by the beamsplitter itself.

Figure 2:
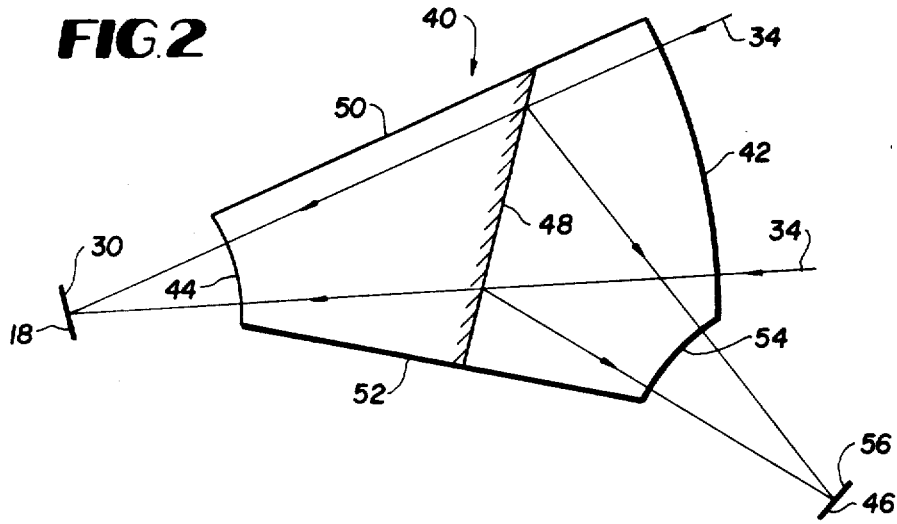
FIG. 2 is a side elevational view of a two way beamsplitter for use in accordance with the teachings of the subject invention.
Figure 3:
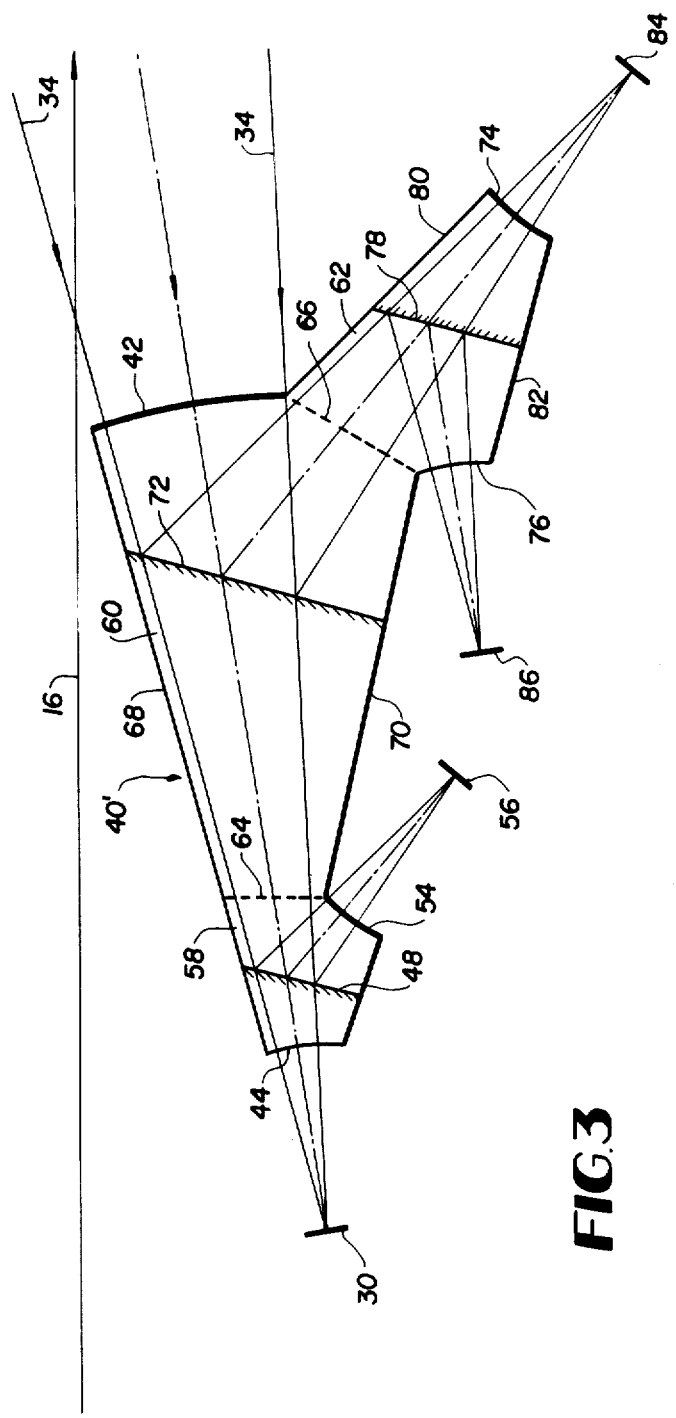
FIG. 3 is a side elevational view of a four way beamsplitter for use in connection with the subject invention.

Referring now to FIG. 2, shown therein is one type of buried surface beamsplitter 40 consisting of a pentagonal element including a partially reflective interior (buried) surface 48 angularly disposed between the spherically curved entrance face 42 and a forward spherically curved exit face 44. In addition to two elongated side faces 50 and 52, a rear spherically curved exit face 54 is formed between the curved entrance face 42 and the side wall 52. The rear exit face 54, moreover, is formed as a folded-back version of the forward exit face 44 with the fold being along the partially reflective surface 48. This, in effect, makes the exit faces 44 and 54 optically coincident. By making the entrance face 42 and the exit face 44 concentric with the aperture stop 10 as shown in FIG. 1A, the rear exit face 54 will be optically concentric with the aperture stop 10 also. Thus, for example, where the converging ray 34 passes directly through the beamsplitter 40 and impinges on the focal surface 30, it also is reflected from the partially reflective surface 48 and impinges on a second focal surface 56. In such a configuration, separate detectors or arrays of detectors can be located at the two separate focal surfaces 30 and 56 for viewing a common scene.

Where more than two focal planes or surfaces are desired, a beamsplitter 40' such as shown in FIG. 3 may be utilized. There, three pentagonal beamsplitter segments 58, 60 and 62 are bonded together along mutually opposing faces 64 and 66. The left segment 58 as shown in FIG. 3 includes a partially reflective buried surface 48 intermediate a direct output face 44 and a rearwardly facing exit face 54 as in FIG. 2. The relatively large middle segment 60, in addition to having a pair of longitudinal sides faces 68 and 70, also includes the convex entrance face 42 as in FIG. 2. A second partially reflective buried surface 72 is angularly disposed between the entrance face 42 and acts to reflect the impinging converging beam 34 back into the right segment 62 which has a pair of concave exit faces 74 and 76 located on opposite sides of a third partially reflective buried surface 78 extending between the side faces 80 and 82.

It can be seen that the converging beam 34 reflected from the partially reflective surface 72 is directed to the partially reflective surface 78 where it leaves at the exit face 74 to impinge on the focal surface 84; however, a portion of the light energy is reflected from the partially reflective surface 78 where it leaves the exit face 76 and impinges on the focal surface 86.

The entrance face 42 and the exit face 44 are not only optically but physically concentric to the aperture stop; however, the exit faces 54, 74 and 76 are optically concentric to the aperture stop 10 shown, for example, in FIG. 1A inasmuch as the exit face 54 coincides with exit face 44 when folded about the partially reflective surface 48. The curved exit face 74 optically coincides with the exit face 44 when considered to be folded back from the partially reflective surface 72. And lastly, the fourth curved exit face 76 coincides with exit face 74 when folded back along the partially reflective surface 78.

When desirable, the beamsplitters 40 and 40' may be dichroic, i.e. having the property of presenting different colors in two different directions. When all reflective pupil concentric objectives uses, for example, the reflector 12 with a dichroic concentric beamsplitter, the change in refractive index in the beamsplitter will cause a slight change in the focal length as wavelength changes and accordingly a different focal length will be produced for each focal plane. This effect can be compensated for in instances where the bandwidth is small by changing the respective path lengths for the output legs of the beamsplitter. When this is done, the radii of the concave exit faces must also be changed in order to keep them respectively concentric to the aperture stop. This is an important feature of the concentric beamsplitter since it permits the use of an all reflective focusing objective. The limiting aberration in the system then becomes spherochromaticism, that is, a change in the spherical aberration with wavelength. Since the power and spherical aberration of concentric beamsplitters is quite low, systems with a very large range of wavelength are possible without resorting to additional structure for compensation of chromatic aberration.

There are no inherent limits in the number of beam splits possible with the subject invention. The only true limitations are a loss of energy in each split and a restricted amount of space available for the beamsplitters in a system environment. Furthermore, the disclosed invention provides for implementation of multi-focal planes operative in different wavelengths, for example, over a range from 0.5 micrometers to 12.0 micrometers, in a single optical system.

Having thus shown and described the subject invention in specific detail, the same has been provided by way of explanation and not of limitation and accordingly all modifications, alterations and changes coming within the spirit and scope of the invention are herein meant to be included.

I claim:

1. A pupil concentric optical imaging system comprising:
  an aperture stop (10);
  an image forming objective including a first optical element (12) concentric with said aperture stop (10) and adapted to converge a light beam (16) impinging thereon from said aperture stop, and
  a second optical element (40) situated in the path of said converging beam (34) from said first optical element (12), said second optical element (40) including an entrance face (42) and at least two exit faces (44, 54) from which images emerge to at least two focal surfaces (30, 56), said entrance and exit faces (42, 44, 54) being curved and optically concentric to said aperture stop (10).

2. The apparatus as defined by claim 1 wherein said first optical element (12) includes a curved reflective surface (14) and wherein said entrance face (42) and said exit faces (44, 54) are convexly curved towards said reflective surface (12) whereby a plurality of angularly offset images projected by separate light beams (16, 20, 22) to said aperture stop (10) forms a respective plurality of spatially separated images on said focal surfaces (30, 56).

3. Apparatus for eliminating predetermined optical aberrations generated by a beamsplitter in a pupil concentric optical system comprising:
  an aperture stop (10);
  at least one image forming objective including at least one light energy converging means (12) concentric with said aperture stop (10) and adapted to converge a light beam (16) impinging thereon from said aperture stop, and
  a beamsplitter (40) situated in the path of a converging light beam (34) from said converging means (12), said beamsplitter including an entrance face (42) and at least two exit faces (44, 54) from which respective images emerge, said entrance and exit faces being curved and optically concentric to said aperture stop (10).

4. The apparatus as defined by claim 3 wherein said beamsplitter (40) comprises a buried surface beamsplitting element.

5. The apparatus as defined by claim 4 wherein said curved entrance face (42) has a curvature which is substantially perpendicular to all parts of the field of view of said system.

6. The apparatus as defined by claim 4 wherein said curved entrance and exit faces (42, 44, 54) are generally spherical.

7. The apparatus as defined by claim 4 wherein said converging means (12) comprises a generally spherical reflector.

8. The apparatus as defined by claim 7 wherein said beamsplitter (40) is located intermediate said generally spherical reflector (12) and said aperture stop (10) and wherein said exit faces (44, 54) are generally spherical and concave and said entrance face (42) is generally spherical and convex and directed to said generally spherical reflector (12).

9. The apparatus as defined by claim 8 wherein the spherical curvature of said entrance face (42) substantially matches the spherical curvature of the face (14) of said reflector (12).

10. The apparatus as defined by claim 4 wherein said buried surface beamsplitting element (40) includes at least one partially reflective interior surface (48) angularly oriented with respect to the said structure face (42) and wherein said exit faces (44, 54) are located on each side of said partially reflective interior surface (48).

11. The apparatus as defined by claim 3 wherein said beamsplitter (40) further comprises a buried surface beamsplitter (40') including a plurality of exit faces (44, 54, 74, 76), each of said exit faces being respectively optically concentric to the aperture stop (10) and forming thereby a respective plurality of images of said light beam (16) on different focal surfaces (30, 56, 84, 86).

12. The apparatus as defined by claim 11 wherein said buried surface beamsplitter (40') includes a plurality of partially reflective interior surfaces (48, 72, 78) angularly oriented with respect to said entrance free (42) and wherein a respective exit face of said plurality of exit faces (44, 54, 74, 76) is located on each side of said plurality of partially reflective interior surfaces (48, 72, 78).

13. The apparatus as defined by claim 12 wherein said beamsplitter (40') is comprised of a plurality of pentagonal segments (58, 60, 62), each of said segments having a respective partially reflective buried interior surface (48, 72, 78).

14. The apparatus as defined by claim 4 and additionally including corrector plate means (32) located at said aperture stop (10).

15. The apparatus as defined by claim 4 wherein said beamsplitter (40, 40') is dichroic.

16. The apparatus as defined by claim 15 wherein said dichroic beamsplitter (40, 40') includes path lengths for the output legs which are compensated for wavelength changes of said light beam.

17. The apparatus as defined by claim 15 wherein said dichroic beamsplitter (40, 40') includes exit faces (44, 54, 74, 76) which are generally spherical and having radii which compensate for wavelength changes of said light beam.

* * * * *